US009246177B2

(12) United States Patent
Stamenkovic et al.

(10) Patent No.: US 9,246,177 B2
(45) Date of Patent: Jan. 26, 2016

(54) BIMETALLIC ALLOY ELECTROCATALYSTS WITH MULTILAYERED PLATINUM-SKIN SURFACES

(75) Inventors: Vojislav R. Stamenkovic, Naperville, IL (US); Chao Wang, Aurora, IL (US); Nenad M. Markovic, Hinsdale, IL (US)

(73) Assignee: UChicago Argonne, LLC, Chicago, IL (US)

( * ) Notice: Subject to any disclaimer, the term of this patent is extended or adjusted under 35 U.S.C. 154(b) by 634 days.

(21) Appl. No.: 13/451,852

(22) Filed: Apr. 20, 2012

(65) Prior Publication Data

US 2013/0085061 A1 Apr. 4, 2013

Related U.S. Application Data

(60) Provisional application No. 61/541,943, filed on Sep. 30, 2011.

(51) Int. Cl.
*B01J 23/89* (2006.01)
*B82Y 30/00* (2011.01)
*B82Y 40/00* (2011.01)
*H01M 4/92* (2006.01)
*C22C 1/02* (2006.01)

(52) U.S. Cl.
CPC ............... *H01M 4/921* (2013.01); *C22C 1/02* (2013.01); *B82Y 30/00* (2013.01); *B82Y 40/00* (2013.01); *H01M 4/926* (2013.01); *Y02E 60/50* (2013.01)

(58) Field of Classification Search
None
See application file for complete search history.

(56) References Cited

U.S. PATENT DOCUMENTS

| 5,879,827 | A | 3/1999 | Debe et al. |
| 7,622,217 | B2 | 11/2009 | Debe et al. |
| 7,871,738 | B2 | 1/2011 | Stamenkovic et al. |
| 2009/0247400 | A1* | 10/2009 | Stamenkovic et al. ....... 502/185 |
| 2010/0092841 | A1* | 4/2010 | Lopez et al. .................... 429/44 |
| 2010/0197490 | A1* | 8/2010 | Adzic et al. ................... 502/326 |
| 2011/0189589 | A1* | 8/2011 | Erlebacher et al. ........... 429/523 |

FOREIGN PATENT DOCUMENTS

WO WO-2011/139705 11/2011

OTHER PUBLICATIONS

Wang et al, Design and Synthesis of Bimetallic Electrocatalyst with Multilayered Pt-Skin Surfaces, Jul. 2011, Journal of the American Chemical Society, pp. 14396-14403.*
Stamenkovic et al, Effect of Surface Composition on Electronic Structure, Stability, and Electrocatalytic Properties of Pt-Transition Metal Alloys: Pt-Skin versus Pt-Skeleton Surfaces, Jun. 2006, Journal of the American Chemical Society, pp. 8813-8819.*

(Continued)

*Primary Examiner* — Melvin C Mayes
*Assistant Examiner* — Colin W Slifka
(74) *Attorney, Agent, or Firm* — Foley & Lardner LLP

(57) ABSTRACT

Compositions and methods of preparing a bimetallic alloy having enhanced electrocatalytic properties are provided. The composition comprises a PtNi substrate having a surface layer, a near-surface layer, and an inner layer, where the surface layer comprises a nickel-depleted composition, such that the surface layer comprises a platinum skin having at least one atomic layer of platinum.

11 Claims, 14 Drawing Sheets

(56) References Cited

OTHER PUBLICATIONS

Stamenkovic et al, Surface Composition Effects in Electrocatalysis: Kinetics of Oxygen Reduction on Well-Defined Pt3Ni and Pt3Co Alloy Surfaces, Oct. 2002, Journal of Physical Chemistry B vol. 106, pp. 11970-11979.*

US Office Action for U.S. Appl. No. 13/800,707, mailed on May 26, 2015, 10 pages.

Baskes and Johnson, "Modified embedded atom potentials for HCP metals," Modelling and Simulation in Materials Science and Engineering, vol. 2, 1994, pp. 147-163.

Baskes, "Modified embedded-atom potentials for cubic materials and impurities," Physical Review B, vol. 46, No. 5, Aug. 1992, pp. 2727-2742.

Kirkland et al., "Simulation of annular dark field stem images using a modified multisclice method," Ultramicroscopy, vol. 23, 1987, pp. 77-96.

Klenov and Stemmer, "Contributions to the contrast in experimental high-angle annular dark-field images," Ultramicroscopy, vol. 106, 2006, pp. 889-901.

Liu et al., "Synthesis and activation of Pt nanoparticles with controlled size for fuel cell electrocatalysts," Journal of Power Sources, vol. 164, 2007, pp. 472-480.

Nellist and Pennycook, "Incoherent imaging using dynamically scattered coherent electrons," Ultramicroscopy, vol. 78, 1999, pp. 111-124.

Stamenkovic et al., "Effect of Surface Composition on Electronic Structure, Stability, and Electrocatalytic Properties of Pt-Transition Metal Alloys: Pt-Skin versus Pt-Skeleton Surfaces," Journal of the American Chemical Society, vol. 128, 2006, pp. 8813-8819.

Stamenkovic et al., "Improved Oxygen Reduction Activity on Pt3Ni(111) via Increased Surface Site Availability", Science, vol. 315, Jan. 2007, pp. 493-497.

Wang et al., "Monodisperse Pt3Co Nanoparticles as a Catalyst for the Oxygen Reduction Reaction: Size-Dependent Activity," The Journal of Physical Chemistry C Letters, vol. 113, 2009, pp. 19365-19368.

* cited by examiner

As prepared: $d_{avg}$ = 5.1nm     acid treated/annealed: $d_{avg}$ = 4.8 nm

BIMETALLIC ALLOY ELECTROCATALYSTS WITH MULTILAYERED PLATINUM-SKIN SURFACES

CROSS REFERENCE TO RELATED APPLICATIONS

This application claims priority to U.S. Provisional Patent Application No. 61/541,943, filed on Sep. 30, 2011 and is incorporated herein by reference in its entirety.

STATEMENT OF GOVERNMENT INTEREST

The United States Government claims certain rights in this invention pursuant to Contract No. DE-AC02-06CH11357 between the U.S. Department of Energy and UChicago Argonne, LLC, representing Argonne National Laboratory.

FIELD OF THE INVENTION

The present invention relates generally to electrocatalysts. More particularly, the present invention relates to systems and methods for a multi-metallic electrocatalyst for fuel cells and metal-air batteries.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

As the global demand for energy has increased, alternative energy generation systems have become an increasingly important component in the worldwide energy generation scheme. Similarly, as the focus on air pollution and energy generation emissions has increased, much attention has focused on fuel cells as a clean and portable source of energy. A primary hindrance to widespread commercial use, however, is that fuel cells require a costly platinum (Pt) catalyst for operation. Therefore, reducing the amount of Pt required will increase the economic viability of fuel cells.

The foreground of sustainable energy is built on a renewable and environment-compatible scheme of chemical-electrical energy conversion. One of the key processes for such energy conversion is the electrocatalytic reduction of oxygen, which is the cathode reaction in fuel cells and metal-air batteries where an electrocatalyst is used to accelerate the course of ORR. Current electrocatalysts used for this reaction are typically in the form of dispersed Pt nanoparticles on amorphous high-surface-area carbon. Considering the high cost and limited availability of Pt, large-scale applications of these renewable energy technologies demand substantial improvement of the catalyst performance so that the amount of Pt needed can be significantly reduced. For example, a five-fold improvement of catalytic activity for the ORR is required for the commercial implementation of fuel cell technology in transportation.

The advancement of heterogeneous catalysis relies on the capability of altering material structures at the nanoscale. Such alteration is particularly important for the development of highly active electrocatalysts with uncompromised durability. This disclosure reports the design and synthesis of a Pt-bimetallic catalyst with multilayered Pt-skin surface that provides superior electrocatalytic performance for the oxygen reduction reaction (ORR). This novel structure was first established on extended thin film surfaces with tailored composition profiles and then implemented in nanocatalysts by organic solution synthesis. Electrochemical studies for the ORR demonstrated that, after elongated exposure to reaction conditions, the Pt-bimetallic catalyst with multilayered Pt-skin surfaces exhibits an improvement factor in activity of more than one order of magnitude versus conventional Pt catalysts. This substantially enhanced catalytic activity, as well as improved durability, indicate great potential toward improving the material properties by fine tuning of the nanoscale architecture.

Prior work on well-defined extended surfaces has shown that high catalytic activity for the ORR can be achieved on Pt-bimetallic alloys ($Pt_3M$, M=Fe, Co, Ni, etc.), due to the altered electronic structure of the Pt topmost layer and hence reduced adsorption of oxygenated spectator species (e.g., $OH^-$) on the surface. It was also found that in acidic electrochemical environment the non-noble 3d transition metals are dissolved from the near-surface layers, which leads to the formation of a Pt-skeleton surface. Moreover, the thermal treatment of $Pt_3M$ alloys in ultra high vacuum (UHV) has been shown to induce segregation of Pt and formation of distinctive topmost layer that was termed Pt-skin surface. However, the same treatment did not cause Pt to segregate over PtM alloys with high content ($\leq 50\%$) of non-Pt elements. More recently, the surfacing of an ordered Pt(111)-skin over $Pt_3Ni(111)$ single crystal having 50% of Ni in the subsurface layer was further demonstrated. This unique nano-segregated composition profile was found to be responsible for the dramatically enhanced ORR activity.

Based on these findings, it could be envisioned that the most advantageous nanoscale architecture for a bimetallic electrocatalyst would correspond to the segregated Pt-skin composition profile established on extended surfaces. Much effort has been dedicated, but it still remains elusive, to finely tune the Pt-bimetallic nanostructure in order to achieve this desirable surface structure and composition profile. Major obstacles reside not only in the difficulty for manipulation of elemental distribution at the nanoscale, but also in the fundamental differences in atomic structures, electronic properties and catalytic performance between extended surfaces and confined nanomaterials. For example, in attempt to induce surface segregation, high-temperature (greater than 600 degrees Celsius) annealing is typically applied for Pt-based alloy nanocatalysts. While improvement in specific activity is obtained, such treatment usually causes particle sintering and loss of electrochemical surface area (ECSA). Besides that, the surface coordination of nanomaterials is quite different from that of bulk materials, i.e., the surface of nanoparticles is rich in corner and edge sites, which have smaller coordination number than the atoms on long range ordered terraces of extended surfaces. These low-coordination surface atoms are considered as preferential sites for the adsorption of oxygenated spectator species (e.g., $OH^-$), and thus become blocked for adsorption of molecular oxygen and inactive for the ORR. Additionally, due to strong Pt—O interaction these low-coordination atoms are more vulnerable for migration and dissolution, resulting in poor durability and fast decay of the catalyst. The latter effect is even more pronounced in Pt-bimetallic systems, considering that more low-coordination sites are present on the skeleton surfaces formed after the depletion of non-precious metals from near-surface regions.

SUMMARY

Various embodiments of the present invention relate to compositions and methods for preparing a platinum alloy having enhanced catalytic properties.

One embodiment of the present disclosure comprises a bimetallic alloy having enhanced electrocatalytic properties. The bimetallic alloy comprises a PtNi substrate having a surface layer, a near-surface layer, and an inner layer, where the surface layer comprises a nickel-depleted composition, such that the surface layer comprises a platinum skin having at least one atomic layer of platinum.

A second embodiment of the present disclosure comprises a method of preparing a bimetallic alloy having enhanced electrocatalytic properties. The method of preparing the bimetallic alloy comprises the steps of synthesizing a PtNi nanoparticle, depleting a surface of the PtNi nanoparticle of nickel to create a platinum skeleton, and smoothing a surface of the platinum skeleton by annealing and creating the PtNi nanoparticles with multilayered platinum skin surfaces.

A third embodiment of the present disclosure comprises a method of preparing a platinum-nickel electrocatalyst. The method of preparing the platinum-nickel electrocatalyst comprises the steps of synthesizing a PtNi nanoparticle, depleting a surface of the PtNi nanoparticle of nickel by exposing the PtNi nanoparticle to an acidic environment to create a platinum skin, smoothing the surface of the platinum skin by annealing the PtNi nanoparticle, and incorporating the PtNi nanoparticle on high surface area carbon by colloidal deposition.

These and other features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 1(a) illustrates cyclic voltammograms; FIG. 1(b) illustrates polarization curves; and FIG. 1(c) illustrates atomic models of the Pt overlayers with different thicknesses.

FIG. 2 illustrates specific activities and corresponding improvement factors as a function of polycrystalline Pt surface for Pt films of various thicknesses. The cyclic voltammograms were recorded in Ar saturated 0.1 M $HClO_4$ electrolyte with a sweeping rate of 50 mV/s. The polarization curves were recorded in the same electrolyte under $O_2$ saturation with a sweep rate of 20 mV/s. The specific activities were presented as kinetic currents normalized by ECSAs obtained from integrated $H_{upd}$, except that for the annealed 3 ML Pt/PtNi surface it was based on $CO_{ad}$ stripping polarization curve.

FIGS. 4(a) illustrates representative high-angle annular dark-field scanning transmission electron microscopy (HAADF-STEM) images taken along the zone axis <110>, as confirmed by the Fast Fourier Transfer (FFT) patterns of the STEM images (shown as insets); FIGS. 4(b) illustrate normalized intensity line profiles extracted for the regions marked in FIG. 4(a), with the backgrounds subtracted; FIG. 4(c) illustrates composition line profiles (normalized for Pt-L peaks) obtained by Energy-dispersive X-ray spectroscopy (EDX) with an electron beam (~2 Å in spot size) scanning across individual catalyst particles; FIG. 4(d)-(e) illustrate overview and cross-section views, respectively, of the nanostructures depicted by atomistic particle simulation. FIGS. 4(a)-(e) are organized in columns for the as-prepared (left), acid treated (middle), and acid treated/annealed (right) PtNi/C catalysts, respectively.

FIGS. 5(a)-(b) illustrate XANES spectra for the PtNi/C catalysts recorded at Ni K edge and Pt $L_3$ edge with an electrode potential of 1.0 V, in comparison with standard spectra of Ni, NiO and Pt. FIG. 5(c) plots cyclic voltammograms; FIG. 5(d) plots polarization curves.

FIG. 6(a) illustrates specific surface area; FIG. 6(b) illustrates specific activity; and FIG. 6(c) illustrates mass activity. Activity improvement factors vs. Pt/C before and after cycling were also shown for specific and mass activities in FIGS. 6(b) and 6(c). FIGS. 6(d) and 6(e) illustrate the XANES spectra recorded for the acid treated and acid treated/annealed PtNi/C catalysts at Ni K edge, at 1.0 V before and after potential cycling. The estimate of ECSA was based on integrated $H_{upd}$ for the Pt/C and acid treated PtNi/C catalysts, while $CO_{ad}$ stripping polarization curve for the acid treated/annealed PtNi/C catalyst.

DETAILED DESCRIPTION OF THE PREFERRED EMBODIMENTS

Figure 1:
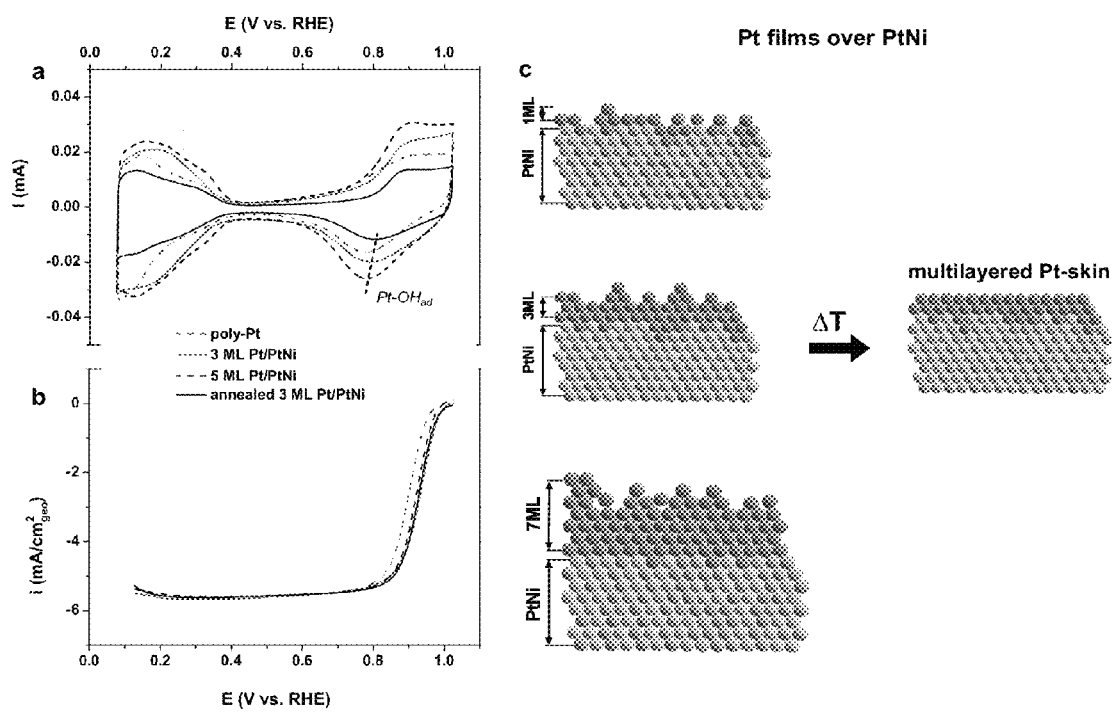
FIGS. 1(a)-(c) and FIG. 2 illustrate electrochemical studies on a Pt thin film deposited over a PtNi substrate by rotating disk electrode (RDE).

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Embodiments of the present invention relate to fine tuning the Pt-bimetallic nanostructure to achieve the advantageous Pt-skin surface structure and composition profile established on extended surfaces as described in U.S. Pat. No. 7,871,738 B2, which is fully incorporated herein by reference. The present invention relates to the composition and synthesis of Pt-bimetallic catalysts with Pt terminated surfaces. Some embodiments of the present invention demonstrate an advanced Pt-bimetallic catalyst that achieves high catalytic activity and superior durability for the ORR. The catalyst contains a unique nanoscale architecture with a PtNi core of 50% Ni and a multilayered Pt-skin surfaces. This particular composition was explored in Chao Wang et al., *Correlation Between Surface Chemistry and Electrocatalytic Properties of Monodisperse $Pt_x Ni_{1-x}$ Nanoparticles*, 21 Adv. Funct. Mater. 147 (2011), which is hereby incorporated by reference in its entirety. In one embodiment, the catalyst has critical parameters such as particle size, thermal treatment, particle sintering, alloy composition, and elemental composition profile that define the catalyst's structure In a method of synthesis in accordance with one embodiment, the initial step involves the synthesis of monodisperse and homogeneous PtNi followed by acid treatment and intentional depletion of Ni from the surface, producing a several layers thick Pt-skeleton type of surface structure. The final portion of the process is the thermal treatment (annealing) aimed to induce the transition from Pt-skeleton into Pt-skin type of structure by surface relaxation and restructuring. For that purpose, in one embodiment, PtNi nanoparticles are synthesized by simultaneous reduction of platinum acetylacetonate, $Pt(acac)_2$ and nickel acetonate, $Ni(ac)_2$ in an organic solution with an average particle size of 5 nm and the ratio between Pt and Ni was set to be 1:1.

Figure 3:
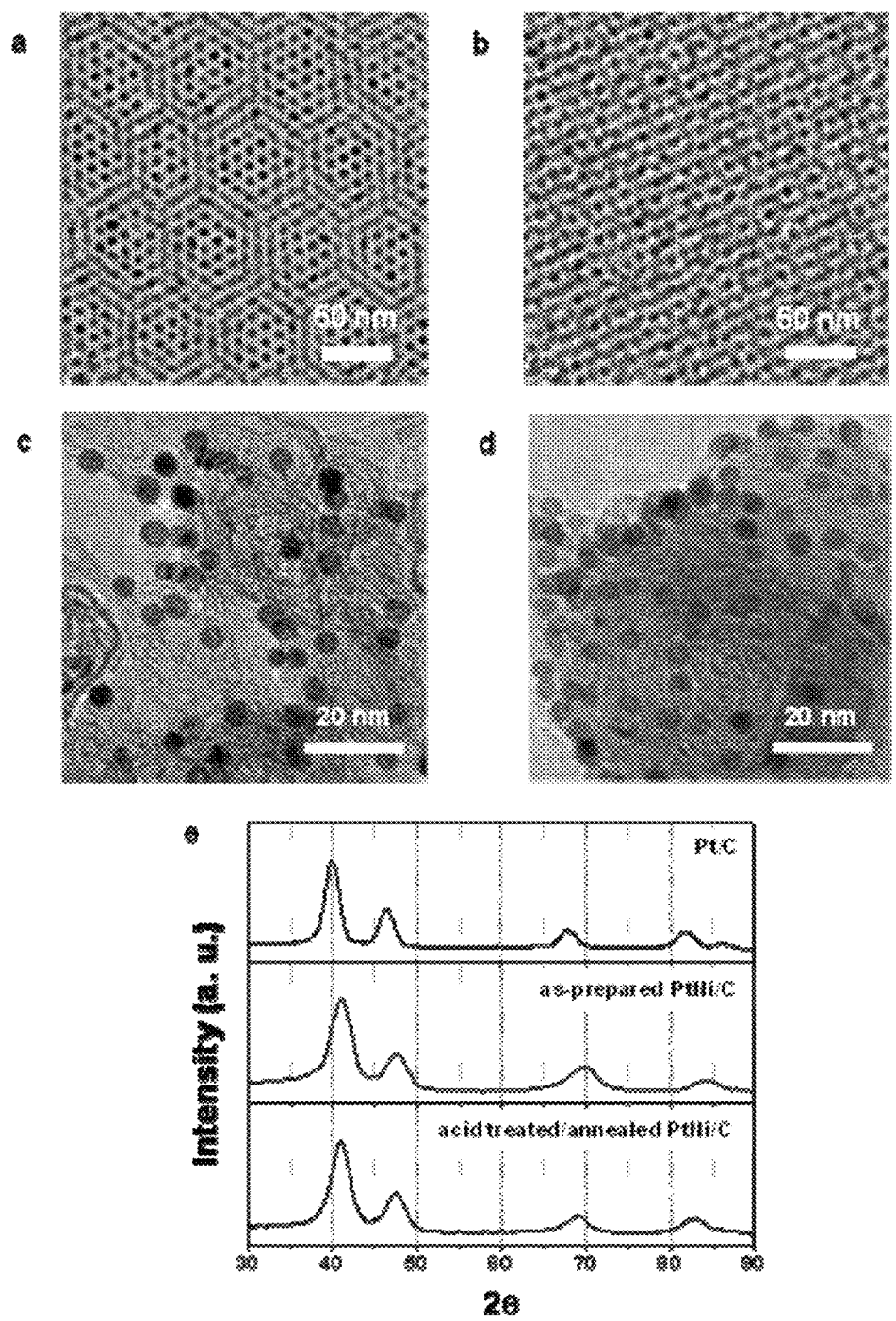
FIGS. 3(a)-(b) are representative transmission electron microscopy (TEM) images for the as-synthesized PtNi nanoparticles.
FIG. 3(c) is a representative TEM image as-prepared.
FIG. 3(d) is a representative TEM image of the acid treated/annealed PtNi/C catalysts.
FIG. 3(e) illustrates X-ray diffraction (XRD) patterns for the PtNi/C catalysts in comparison with commercial Pt/C (~6 nm in particle size).
Figure 9:
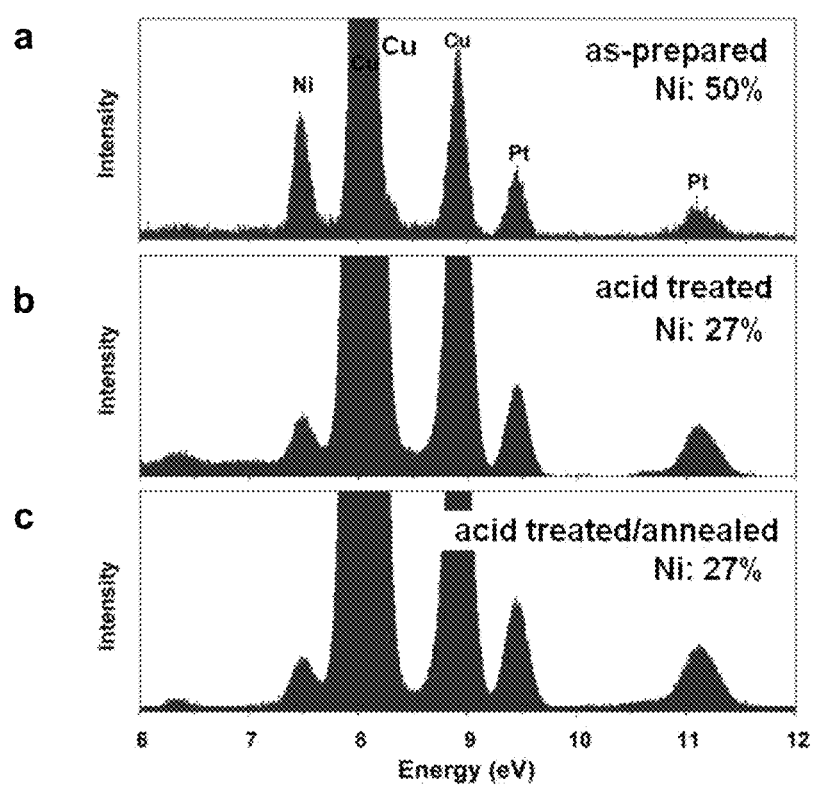
FIGS. 9(a)-(c) illustrate EDX spectra for the as-prepared, acid leached, and acid leached/annealed PtNi/C catalysts.

FIGS. 3(a) and 3(b) show representative transmission electron microscopy (TEM) images of the as-synthesized (as set forth in the Examples) PtNi nanoparticles prepared with a molar ratio of 1:2 between the Pt and Ni precursors. The nanoparticle size is confirmed to be approximately 5 nm with a very narrow size distribution, as evidenced by the formation of various types of super lattices after drying the nanoparticle suspension (in hexane) under ambient conditions. The shape of particles are revealed from TEM images, and it is verified that cubooctahedral particles are present. The final composition of the examples below was characterized by energy-dispersive X-ray spectroscopy (EDX), which confirmed an atomic ratio of Pt/Ni≈1/1 (FIGS. 9(a)-(c)).

Figure 10:
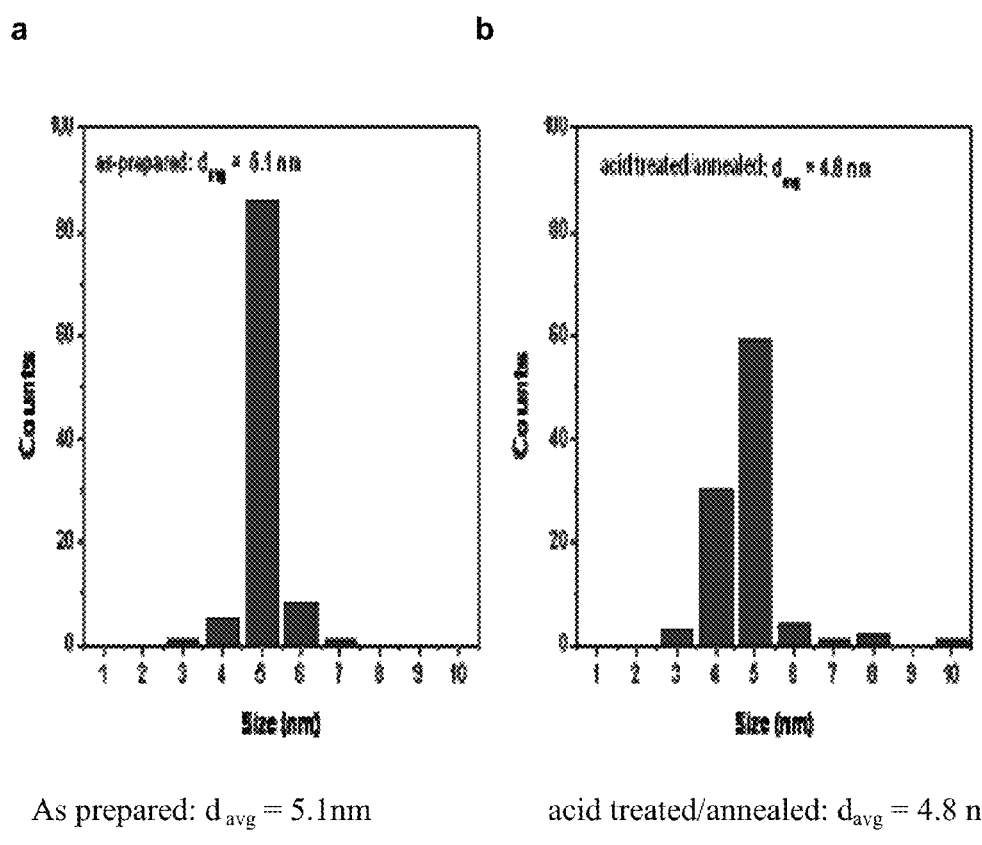
FIGS. 10(a)-(b) illustrate statistical results of the particle sizes for the as-prepared and acid leached/annealed PtNi/C catalysts. Particle sizes were obtained by counting 100 nanoparticles from representative TEM images.

The as-synthesized nanoparticles are incorporated into carbon black (~900 m²/g) via a colloidal-deposition method and the organic surfactants are efficiently removed by thermal treatment. Such as-prepared PtNi/C catalyst are firstly treated by acid to dissolve the surface Ni atoms (FIGS. 9(a)-(c)) and then annealed at 400 degrees Celsius. To understand the impact of acid treatment on the PtNi/C, a large assembly (e.g. a few hundred) of nanoparticles/catalyst particles was analyzed. The overall ratio of Ni was determined to be 50%, 27%, and 27% in the three PtNi/C catalysts, respectively. The decrease of Ni content was due to the depletion of Ni from near-surface layers by acid treatment. TEM images of the acid treated/annealed catalyst do not show notable changes in morphology (FIGS. 3(c) and 3(d)), except a slight decrease (~0.3 nm) in average particle size (FIGS. 10(a)-(b)). The average particle size decreased by 0.3 nm after the acid and annealing treatments. This was due to the depletion of surface Ni by acid treatment and subsequent surface relaxation/smoothening by annealing as further described below. It is important to emphasize that although surface/near surface Ni was removed, the content of Ni in the center of the particles, however, remains unchanged (~50%) after the treatments. In one embodiment, the consecutive treatments bring on the Pt-skin type of surface over the substrate with 50% of Ni, which otherwise would not be possible because complete segregation of Pt only takes place in $Pt_3M$ systems. Accordingly, one advantage of the present disclosure over $Pt_3M$ systems is that the Pt-skin is multilayered, which substantially improves the stability of nanoparticles.

The applied treatments, in particular annealing at the moderate temperature (400 degrees Celsius) did not induce agglomeration of the catalyst particles. Both the as-prepared and treated catalysts show monodisprse particle size distribution. The consistent control in particle size has enabled the systematic study of electrocatalytic properties of the bimetallic catalysts with particle size effect excluded. Additionally, X-ray diffraction (XRD) analysis was used to characterize the crystal structure of the nanoparticles. Compared with the commercial Pt/C catalyst (Tanaka, ~6 nm), both the as-prepared and acid treated/annealed PtNi/C systems show a face-centered cubic (fcc) pattern with noticeable shifts (e.g., ~1 degree for (111) peak) toward high angle (FIG. 3(e)), corresponding to a decrease of lattice constant due to alloying between Pt and Ni. The XRD pattern of acid treated/annealed nanoparticles has sharper peaks compared to the as-prepared one, which indicates the increased crystallinity after annealing. These observations, in addition to the absence of peaks for separate Pt or Ni phases, show that the bimetallic catalyst preserved the alloy properties after the applied treatments.

Figure 4:
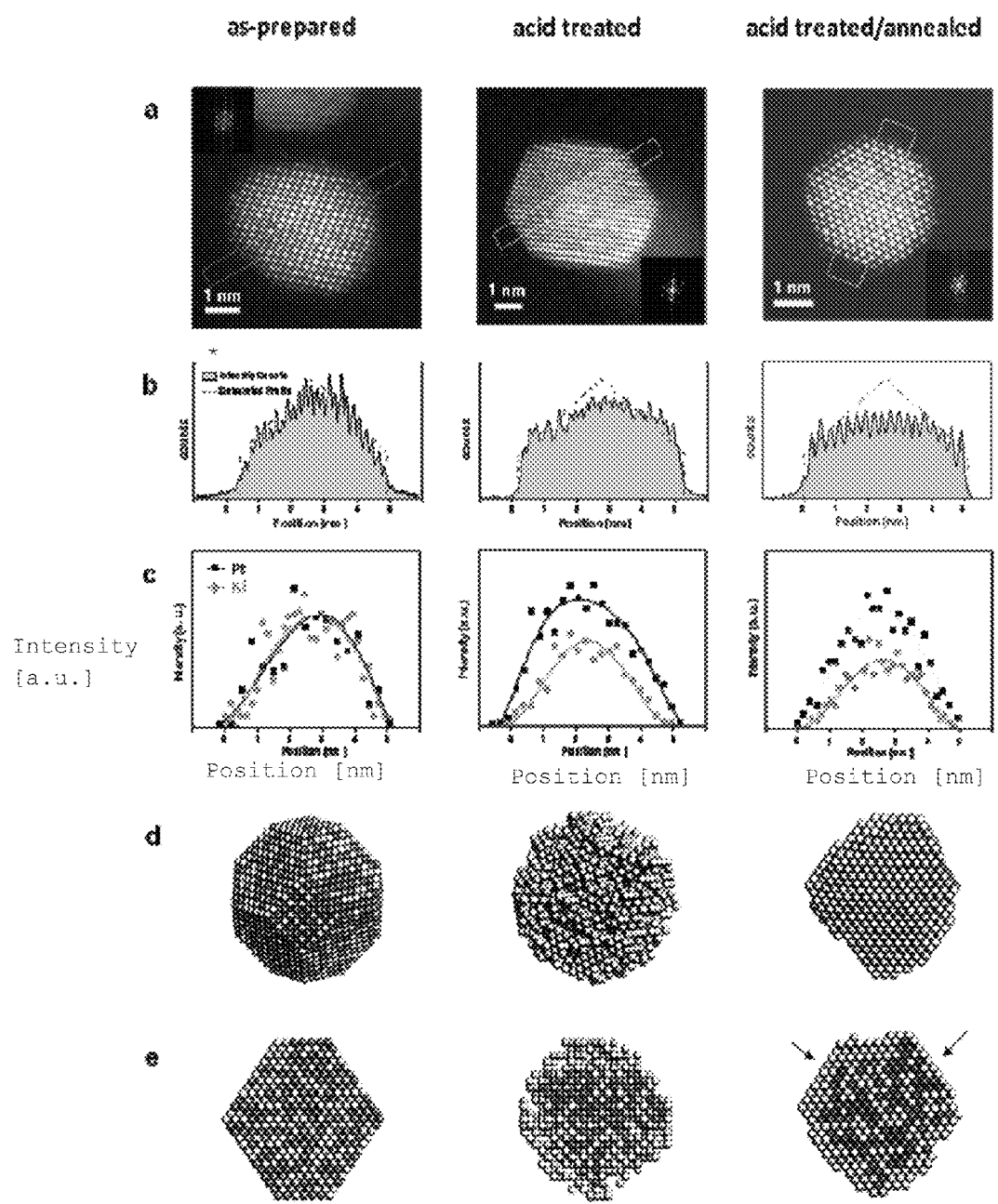
FIGS. 4(a)-(e) illustrate microscopic characterizations and theoretical simulations of nanostructure evolution in the PtNi/C catalysts.

The nanostructures and composition profiles of the PtNi/C catalysts were characterized by atomically resolved aberration-corrected high angle annular dark field-scanning transmission electron microscopy (HAADF-STEM) in combination with energy dispersive x-ray spectroscopy (EDX). FIG. 4(a) shows representative HAADF-STEM images taken along the <110> zone axis of the as-prepared (left), acid treated (middle) and acid treated/annealed (right) PtNi/C catalysts, with the intensity profiles along <001> directions across the single particles shown in FIG. 4(b). Compared with the benchmark intensity profiles calculated for ideal octahedral alloy nanoparticle of the same size and orientation (see the Supplementary Information), nanoparticle exposed to acid shows approximately 3-4 peaks on each side stretching above the standards, indicating the formation of a Pt-rich overlayer. This feature was preserved after annealing, but with 2-3 Pt-rich peaks on each side, corresponding to a reduced Pt overlayer thickness due to restructuring and smoothing (FIG. 4(b)). These findings were further confirmed by EDX analysis. By scanning the e-beam across the particle while simultaneously analyzing the generated X-rays, composition line profiles were obtained for the nanoparticles (FIG. 4(c)). It can be seen that the distribution of Pt and Ni in the as-prepared catalyst was highly intermixed and the sketched trend lines were almost identical, indicating a homogeneous alloy nature of the catalyst particles. The treated catalysts have substantially broader distribution of Pt atoms than Ni, with a difference of approximately 1 nm (at the half maximum of the trend lines) for the acid treated and approximately 0.6 nm for the acid treated/annealed catalyst. Hence both the intensity and composition line profiles show that multilayered Pt-rich surface structure was formed by acid treatment, and preserved after annealing.

Figure 12:
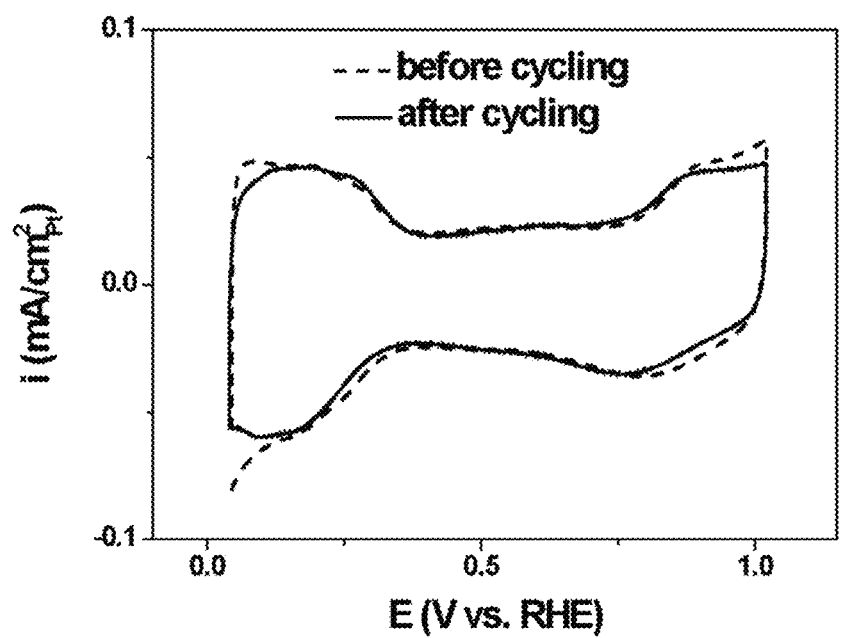
FIG. 12 illustrates CVs of the acid treated/annealed PtNi/C catalyst before and after potentially cycling.

The microscopic characterizations strongly point towards surface restructuring in the bimetallic catalyst upon annealing. This was additionally depicted by atomistic simulations of the nanostructure evolution, which was subject to the acid and annealing treatments (FIG. 4(d) for overviews and FIG. 12(a and b) for cross-section views. It shows that removing Ni atoms from the surface led to the formation of a Pt-skeleton overlayer with a thickness of up to 3 atomic layers. Further relaxation of low-coordination surface atoms resulted in a multilayered Pt-skin surface whereas the PtNi core was barely affected. It is important to mention that the relaxation process is expected to induce preferential formation of highly active (111) surface (labeled by arrows in FIG. 4(e)), due to the higher atomic coordination, i.e., lower surface energy, of this facet compared to others.

Figure 5:
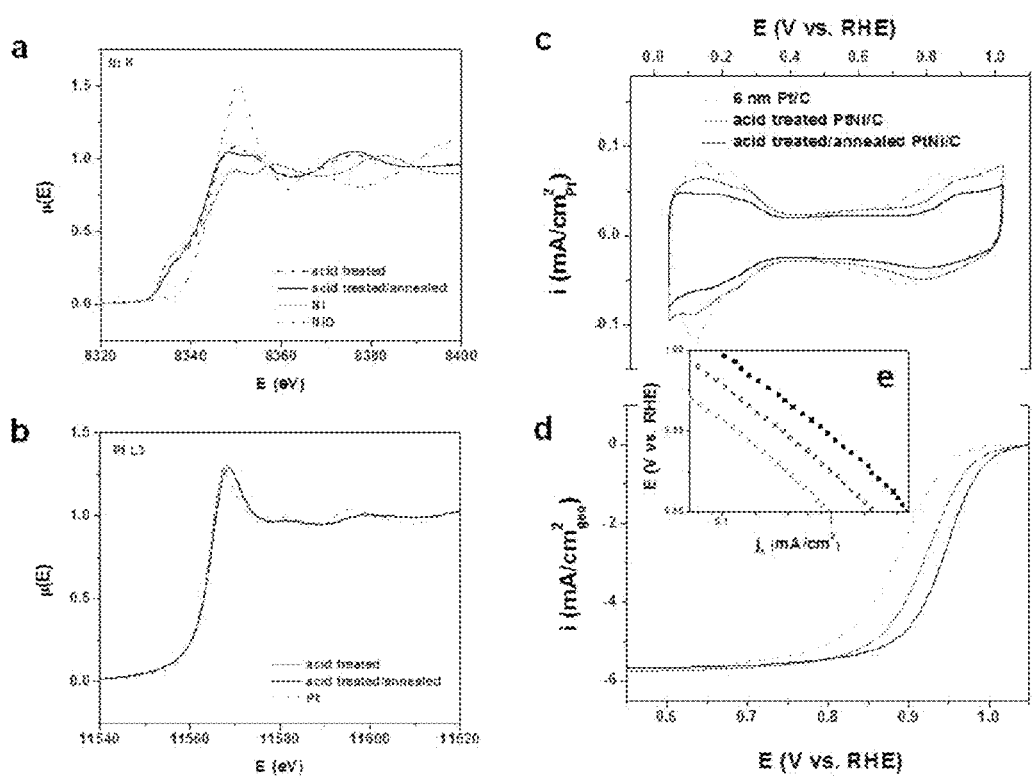
FIGS. 5(a)-(d) illustrate in situ X-ray absorption and electrochemical studies of the PtNi/C catalysts.
FIG. 5(e) are Tafel plots with the specific activity ($j_k$, kinetic current density) as a function of electrode potential, in comparison with the commercial Pt/C catalyst. Estimation of ECSA was based on integrated $H_{upd}$ for the Pt/C and acid treated PtNi/C catalysts, while $CO_{ad}$ stripping polarization curve for the acid treated/annealed PtNi/C catalyst.
Figure 6:
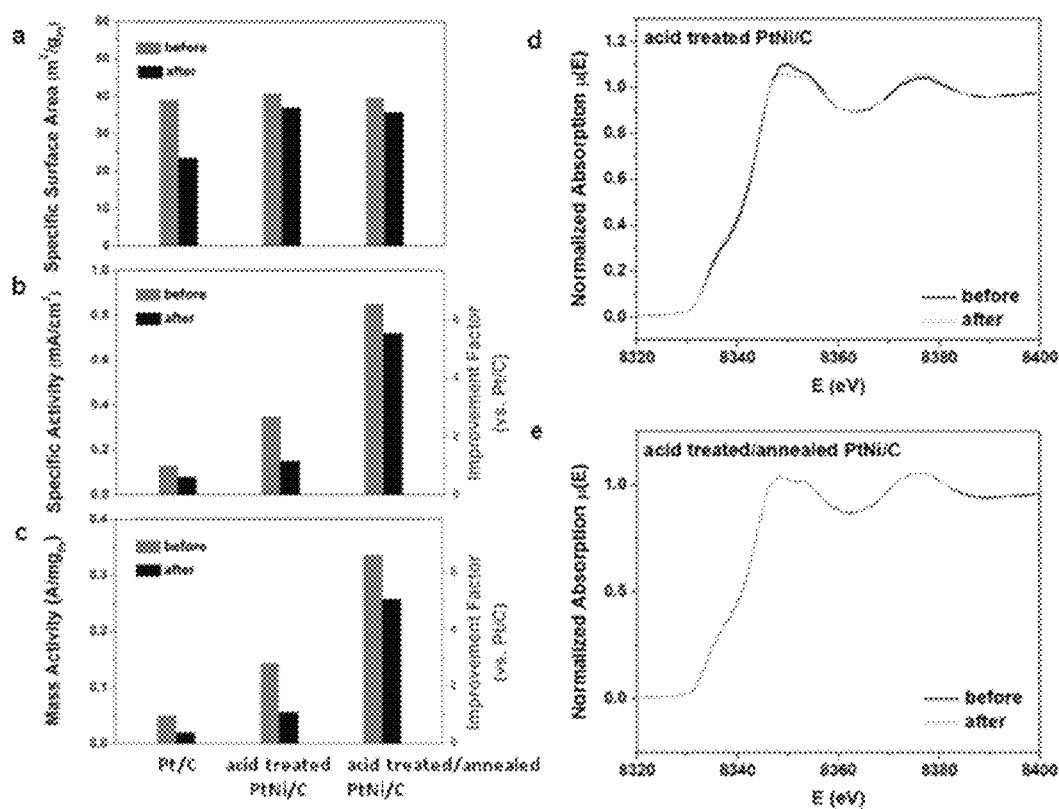
FIGS. 6(a)-(e) summarize electrochemical durability studies obtained by RDE before and after 4,000 potential cycles between 0.6 and 1.1 V for the Pt/C and PtNi/C catalysts in 0.1M $HClO_4$ at 0.95 V and 60 degrees Celsisus.

To gain further insight into the nanostructure evolution, especially the correlation of surface structures to their electrochemical properties, in situ X-ray absorption near edge structure (XANES) studies of the nanocatalysts were conducted. FIGS. 5(a) and 5(b) show the normalized XANES spectra collected at Ni K and Pt $L_3$ edges, under the ORR-relevant conditions (~1.0 V). Compared with the spectra of reference foils, Pt and Ni edge positions were found to correspond to the bulk oxidation state of zero for both elements in the treated catalysts. It is intriguing to see that the acid treated catalyst shows higher white line intensity than the acid treated/annealed catalyst at the Ni edge, which is caused by the presence of a small amount of NiO underlying the highly corrugated Pt-skeleton surface morphology in the acid treated catalyst, whereas subsurface Ni in the acid treated/annealed catalyst was well protected. The distinction in surface structure between differently treated catalysts is even more visible at the Pt edge, where a slightly lower white line intensity for the acid treated/annealed catalyst corresponds to a reduced amount of platinum oxides under the same conditions, and more fundamentally, less oxophilic surface with larger average surface coordination number. The findings from XANES provide additional evidence for the formation of surface relaxed multilayered Pt-skin in the acid treated/annealed catalyst and its superiority in protecting the inner Ni from leaching out.

Figure 2:
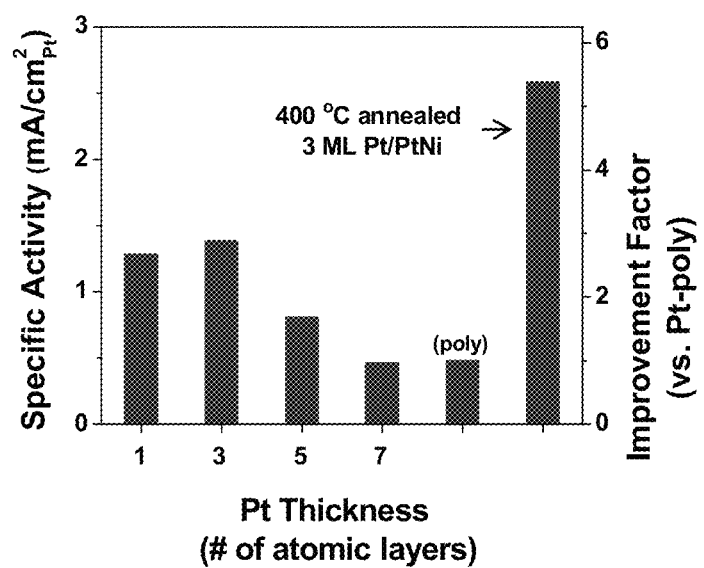

These results have achieved the desirable nanoscale architecture established on PtNi supported Pt films, i.e., multilayered Pt-skin over a particle core with 50% of Ni. Considering what was revealed from the studies on extended surfaces, the obtained nanocatalyst should show superior catalytic performance for the ORR, which was examined by RDE measurements. FIGS. 5(c)-(e) summarize the electrochemical studies for the three types of nanocatalysts. It can be seen from the voltammograms (FIG. 5(c)) that the $H_{upd}$ region (E<0.4 V) of the acid treated/annealed catalyst is largely suppressed versus the acid treated sample. On the positive side of the potential scale the onset of oxide formation for the acid treated/annealed catalyst is shifted positively by about 20 mV versus that for the acid treated catalyst, and more than 50 mV with respect to Pt/C. Similar shifts are also seen for the reduction peaks in the cathodic scans. Such peak shifts are representative of a less oxophilic catalyst surface due to the formation of multilayered Pt-skin structure, and further corresponding to remarkable enhancement in ORR activity as evidenced by the polarization curves shown in FIG. 5(d) and the corresponding Tafel plots shown in FIG. 5(e). These findings are reminiscent of those on extended surfaces (FIG. 1) and from in situ XANES studies (FIG. 5(b)). At 0.95 V the specific activity of the acid treated/annealed PtNi/C reaches 0.85 mA/cm$^2$, compared to 0.35 mA/cm$^2$ for the acid treated specimen and 0.13 mA/cm$^2$ for Pt/C. This translates into improvement factors vs. Pt/C of 3 and over 6 for the acid treated and acid treated/annealed PtNi/C catalysts, respectively, which is also in line with the results obtained on extended surfaces (FIG. 2). Therefore, the electrochemical studies of nanocatalysts validated that the scheme of the near surface architecture established on extended surfaces had been successfully applied to nanocatalysts by forming a multilayered Pt-skin surface. Remarkably the ECSA of this catalyst obtained from integrated $H_{upd}$ region was over 30% lower than that from CO stripping (FIG. 8(a)-(b)), which also confirms the formation of Pt-skin type of surface in the nanocatalyst.

Figure 11:
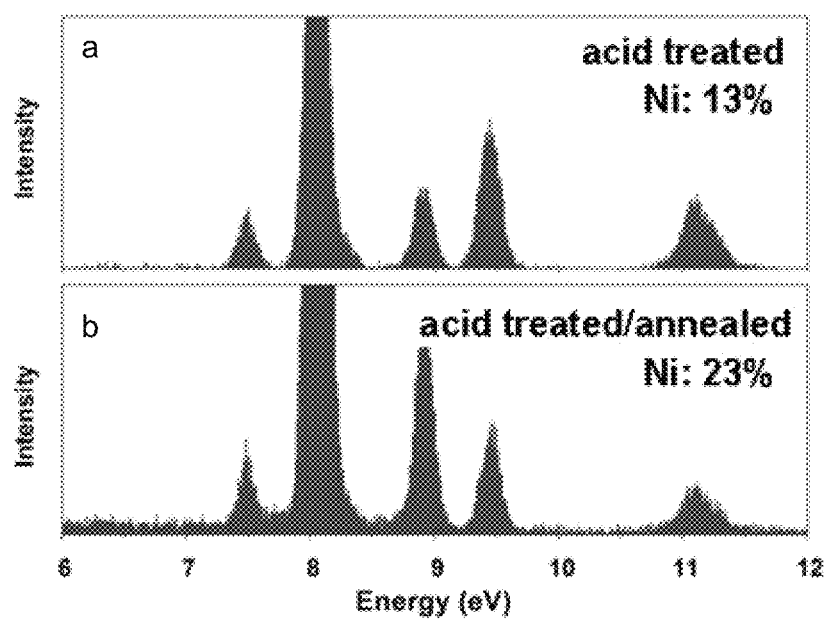
FIGS. 11(a)-(b) illustrate EDX spectra for the acid leached and acid leached/annealed PtNi/carbon catalysts after the durability studies (4,000 cycles between 0.6 and 1.1 V at 60 degrees Celsius).

Moreover, the developed Pt-bimetallic catalyst with the unique nanoscale architecture does not only show enhanced catalytic activity, but also improved catalyst durability for the ORR. FIGS. 6(a)-(e) summarizes the electrochemical results for the PtNi/C catalysts before and after 4,000 potential cycles between 0.6 and 1.1 V at 60 degrees Celsius. Both the acid treated and acid treated/annealed PtNi/C catalysts had minor losses (~10%) in ECSA after cycling, in comparison to a substantial drop (~40%) for Pt/C (FIG. 6(a)). The acid treated/annealed PtNi/C had only 15% loss in specific activity, in contrast to 57% for the acid treated catalyst and 38% for Pt/C (FIG. 6(b)). In situ XANES was also applied to monitor the catalyst structures in the durability studies (FIGS. 6(d)-(e)). The acid treated/annealed PtNi/C does not show visible changes, whereas reduction of absorption at the Ni edge was observed for the acid treated PtNi/C during and after potential cycling. These findings are in line with the elemental analysis of the PtNi/C catalysts after the durability experiment, which shows no loss for the Ni content in the acid treated/annealed catalyst in contrast to the significant loss of Ni in the acid treated catalyst (FIGS. 11(a)-(b)). For instance, with reference to FIGS. 11(a)-(b), it is shown that 23% Ni (overall composition in the catalyst) was left in the acid leached/annealed catalyst, versus only 13% for the acid leached one. Compared with the same initial Ni content (~27%) in these two catalysts, these results demonstrated the substantially improved durability of the bimetallic catalyst after additional annealing treatment which had the multilayered Pt-skin formed to protect the subsurface Ni from leaching out.

Thus, for some embodiments it is assured that the multilayered Pt-skin formation has indeed provided complete protection of the Ni inside the catalyst and enabled the sustained high catalytic activity under fuel cell operating conditions. Based on that, in addition to diminished number of vulnerable undercoordinated Pt surface atoms after annealing, multilayered Pt-skin formation is also thick enough to protect subsurface Ni from dissolution that otherwise occurs through the place-exchange mechanism, (FIGS. 6(a)-(e) and FIGS.

11(a)-(b)). At the same time, multilayered Pt-skin is thin enough to maintain typical skin-like properties (e.g. unique electronic structure that is associated with specific adsorption properties that lead to superior activyt for the ORR), which originate from altered electronic structure due to the presence of desirable amount of subsurface Ni. As a result, the PtNi/C catalyst with multilayered Pt-skin surfaces exhibited improvement factors in mass activity of more than one order of magnitude after the elongated potential cycling versus the Pt/C catalyst (FIG. 6(c)).

EXAMPLES

Examples started with Pt thin films of controlled thickness deposited over PtNi substrate to explore the correlation between the surface composition profile and catalytic performance. These findings were then applied for guiding the synthesis of nanocatalysts with the optimized structure. The outcome of such effort is an advanced Pt-bimetallic catalyst with altered nanoscale architecture that is highly active and durable for the ORR.

Pt films were deposited at room temperature on PtNi substrates (6 mm in diameter) which were set 125 mm away from DC sputter magnetrons in 4 mTorr Argon gas (base vacuum $1\times10^{-7}$ Torr). Pt source rate (0.32 Å/sec) was determined by quartz crystal microbalance and an exposure duration of 7.0 sec was calibrated for the nominal thickness of approximately 2.2-2.3 Å for a monolayer of Pt. The film thickness was derived from exposure time of computer controlled shutters during sputtering.

In one synthesis of PtNi nanoparticles, 0.67 mmol of $Ni(ac)_2 0.4H_2O$ was dissolved in 20 mL of diphenyl either in the presence of 0.4 mL of oleylamine and 0.4 mL of oleic acid. 0.33 mmol of 1,2-tetradodecanediol was added to and the formed solution was heated to 80 degrees Celsius under Ar flow. After a transparent solution formed, the temperature was further raised to 200 degrees Celsius, where 0.33 mmol of $Pt(acac)_2$ dissolved in 1.5 mL of dichlorobenzene was injected. The solution was kept at this temperature for 1 hour and then cooled down to room temperature. The amount of 60 mL of ethanol was added to precipitate the nanoparticles and the product was collected by centrifuge (6000 rpm, 6 minutes). The obtained nanoparticles were further washed by ethanol for two times and then dispersed in hexane. The as-synthesized PtNi nanoparticles were deposited on high surface area carbon (~900 $m^2$/g) by mixing the nanoparticles with carbon black (Tanaka, KK) in hexane or chloroform with a 1:1 ratio in mass. This mixture was sonicated for 1 h and then dried under nitrogen flow. The organic surfactants were removed by thermal treatment at approximately 150-200 degrees Celsius in an oxygenated atmosphere. The obtained catalyst is denoted as "as-prepared PtNi/C". For the acid treatment, approximately 10 mg of the as-prepared PtNi/C catalyst was mixed with 20 ml of 0.1 M $HClO_4$ electrolyte that has been used in electrochemical measurements. After overnight exposure to acidic environment, the product was collected by centrifuge and washed three times by deionized water. Such nanoparticles are named as "acid treated PtNi/C". The acid treated PtNi/C was further annealed at 400 degrees Celsius to reduce low-coordinated surface sites, and the obtained catalyst is termed as "acid treated/annealed PtNi/C".

TEM images were collected on a Philips EM 30 (200 kV) equipped with EDX functionality. XRD patterns were collected on a Rigaku RTP 300 RC machine. STEM and elemental analysis were carried out on JEOL 2200FS TEM/STEM with a CEOS aberration (probe) corrector. The microscope was operated at 200 kV in HAADF-STEM mode equipped with a Bruker-AXS X-Flash 5030 silicon drift detector. The probe size was approximately 0.7 Å and the probe current was approximately 30 pA during HAADF-STEM imaging. When accumulating EDX data, the probe current was increased to approximately 280 pA and the probe size was approximately 2 Å. The presented EDX data were confirmed to be from "e-beam damage-free" particles by comparing STEM images before and after EDX acquisition.

Figure 14:
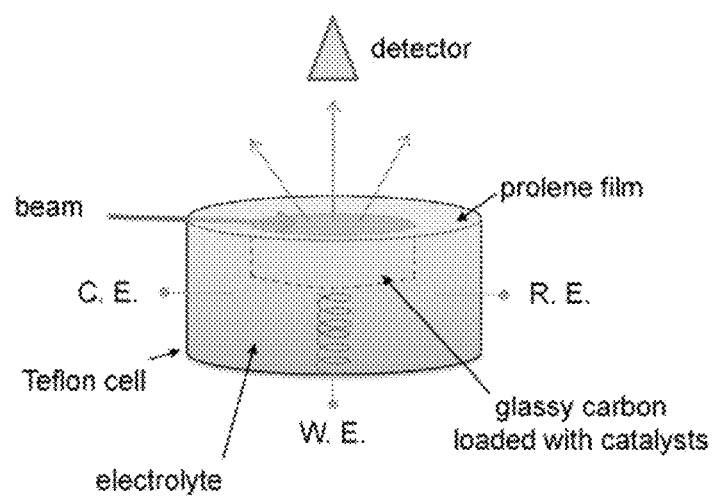
FIG. 14 illustrates a electrochemical cell setup for in situ XAS.

X-ray fluorescence spectra of at the Ni K and Pt $L_3$ edges were acquired at bending magnet beamline 12-BM-B at the Advanced Photon Source (APS), Argonne National Laboratory. The incident radiation was filtered by a Si(111) double-crystal monochromator (energy resolution $\Delta E/E=14.1\times10^{-5}$) with a double mirror system for focusing and harmonic rejection. All the data were taken in fluorescence mode using a 13-element Germanium array detector (Canberra) which was aligned with the polarization of the X-ray beam to minimize the elastic scattering intensity. Co and Ge filters (of 6 absorption length in thickness) were applied in front of the detector to further reduce the elastic scattering intensity for the Ni K and Pt $L_3$ edges, respectively. The Ni K and Pt $L_3$ edge spectra were calibrated by defining the zero crossing point of the second derivative of the XANES spectra for Ni and Pt reference foils as 8333 eV and 11564 eV, respectively. The background was subtracted using the AUTOBK algorithm and data reduction was performed using Athena from the IFEF-FIT software suite. A scheme of the home-made in situ electrochemical cell and setup at beamline is illustrated in FIG. 14. With reference to FIG. 14, catalysts were loaded on a glassy carbon disk which served as the working electrode in a home-made in situ electrochemical cell. A saturated Ag/AgCl electrode and a Pt wire were used as reference and counter electrodes, respectively. 0.1 M $HClO_4$ with oxygen removed by Ar bubbling was used as electrolyte. The cell was sealed by a prolene film and further wrapped by a plastic bag which was continuously filled in with nitrogen (or oxygen for durability studies) to control the gaseous conditions inside the cell. The X-ray beam was set to glancing incidence to the working electrode surface to maximize fluorescence and minimize elastic scattering.

The electrochemical measurements were conducted in a three-compartment electrochemical cell with a rotational disc electrode (RDE, 6 mm in diameter) setup (Pine) and a Autolab 302 potentiostat. A saturated Ag/AgCl electrode and a Pt wire were used as reference and counter electrodes, respectively. 0.1 M $HClO_4$ was used as electrolyte. The catalysts were deposited on glassy carbon electrode substrate and dried in Ar atmosphere without using the ionomer. The loading was controlled to be 12 $\mu g_{pt}/cm^2_{disk}$ for PtNi/C nanocatalysts. All the potentials given in the discussion were against reversible hydrogen electrode (RHE), and the readout currents are recorded with ohmic iR drop correction during the measurements.

Results and Discussion

Figure 7:
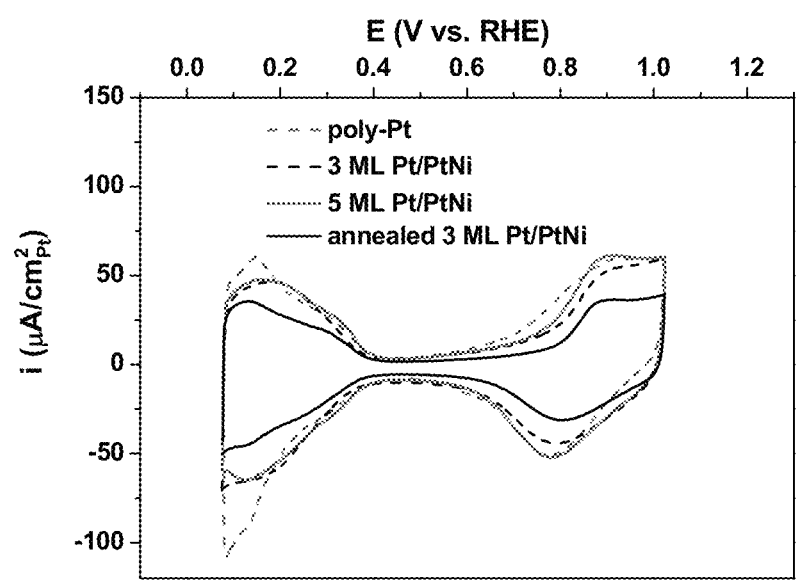
FIG. 7 illustrates cyclic voltammetries of the Pt/PtNi films of various thicknesses with current normalized by the ECSAs. The ECSAs were estimated from integrated $H_{upd}$, except that for the annealed 3 ML Pt/PtNi surface which was based on integrated $CO_{ad}$ stripping polarization curve. Cyclic voltammetries were recorded in Ar saturated 0.1 M $HClO_4$ electrolyte with a sweep rate of 50 mV/s.

Pt films of various thicknesses, i.e., approximately 1-7 atomic monolayers (ML), were deposited in vacuum by physical vapor sputtering on PtNi (Pt:Ni=1:1) substrate and then transferred to electrochemical cell for further characterizations. The as-sputtered Pt films consisted of randomly distributed Pt nanoclusters (~1 nm), which simulate the Ni depleted Pt-skeleton structures. The film thickness was varied to explore the dependence of catalytic activity on the surface depletion depth in Pt-skeleton type of surfaces. The choice of PtNi substrate was based on previous results from nanosegregated extended surfaces and most recent findings related to composition dependent electrochemical properties of $Pt_xNi_{1-x}$ nanoparticles, which had confirmed the superior catalytic properties of systems with 50% of Ni in subsurface layers. FIGS. 1(a)-(c) and FIG. 2 summarize the results of electrochemical studies for these thin films by rotating disk electrode (RDE). Cyclic voltammograms (CVs, FIG. 1(a)) of the as-sputtered films correspond to polycrystalline Pt (poly-Pt) with similar, but slightly enlarged, underpotentially deposited hydrogen ($H_{upd}$) regions (E<0.4 V) due to the rougher surfaces. The onset of Pt—$OH_{ad}$ formation for the Pt/PtNi films has anodic shifts (e.g., ~30 mV for 3 ML Pt) for most of the Pt films (≤5 ML) compared to poly-Pt (more visible in the CVs shown in FIG. 7, with currents normalized by the electrochemical surface area (ECSA) obtained from integrated $H_{upd}$ region). Correspondingly, similar positive shifts are also present in the polarization curves for the ORR (FIG. 1(b)). Such shifts correspond to altered electronic/adsorption properties of the surface and they are in line with substantial improvement in ORR catalytic activity. The largest shift of approximately 30 mV was obtained for the Pt films with thicknesses of three atomic layers. Measured specific activities at 0.95 V, expressed as kinetic current normalized by the ECSA, show that the thinner films (≤3 ML) have improvement factors of approximately 2.5 versus poly-Pt surface, which is in line with the previous results on polycrystalline $Pt_3M$ bulk alloys with the skeleton type of surfaces. Reduced enhancement was observed for thicker Pt films, e.g., improvement factor of 1.7 for 5 ML of Pt, while the specific activity measured for the 7 ML film was close to that of poly-Pt. It should be noted here that for the as-sputtered films, 1 ML of Pt may not be able to protect Ni in the alloy substrate from dissolution, whereas addition of a second and/or third layer can potentially diminish this process. This may also be the reason that the surfaces with 2 or 3 ML of Pt were found to be more active than that with 1 ML. These findings revealed that bimetallic systems with Pt-skeleton near-surface formation of up to three atomic layers in thickness are still capable of efficiently harvesting the beneficial properties of bimetallic alloys, while protecting the subsurface Ni from leaching out.

Since the as-sputtered skeleton-type of surfaces have abundant low-coordination sites that are detrimental to the ORR, thermal treatment was applied to investigate potential surface restructuring and further catalytic improvement. A moderate temperature of approximately 400 degrees Celsius was chosen as it was determined to be optimal for Pt-bimetallic nanocatalysts. In FIG. 1(a) the CV of annealed 3 ML Pt/PtNi surface is also shown. The suppressed $H_{upd}$ region and even larger positive shift of the Pt—$OH_{ad}$ peak (FIG. 7) indicates the formation of Pt-skin type of surface, which is smoother and less oxophilic with significantly reduced number of low-coordination surface atoms.

Figure 8:
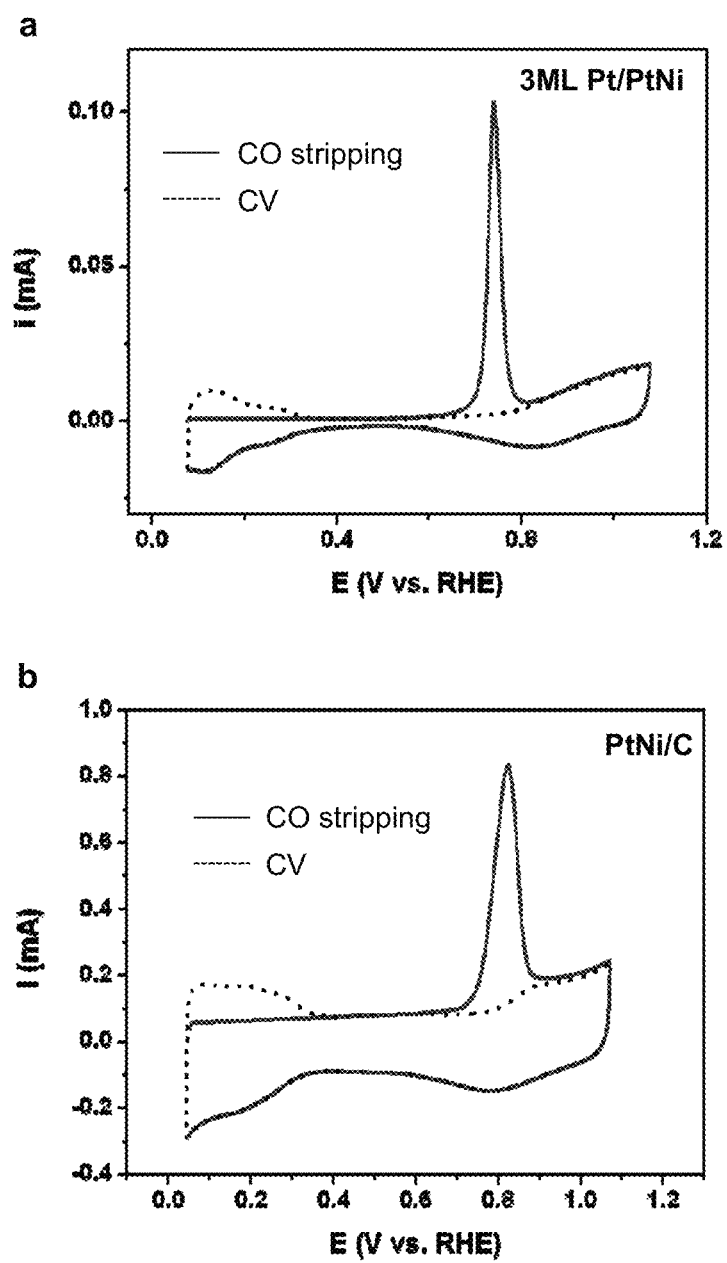
FIGS. 8(a)-(b) illustrate representative CO stripping curves (solid lines) recorded for electrochemical oxidation of adsorbed CO monolayer obtained from RDE in hanging meniscus configuration in 0.1M $HClO_4$ on (a) 400 degrees Celsius annealed 3 ML Pt/PtNi film and (b) acid treated/annealed PtNi/C. The scans (dashed lines) for blank CV are also shown for comparison. The charge calculated by integration of the area under the CO stripping peak was used to estimate ECSA in order to diminish the underestimation from $H_{upd}$ due to the altered electronic/adsorption properties of Pt-skin surface.

Additional proof of the transition towards Pt-skin is provided by the measured boost in specific activity for the ORR (FIG. 2), reaching an improvement factor of more than 5 with respect to poly-Pt (FIG. 1(c)). This high catalytic activity was based on the ECSA estimated by integrating the area under the CO stripping polarization curves, not $H_{upd}$. In particular, integrated charges can be translated into surface area based on the assumption that 1 cm² of polycrystalline Pt surface corresponds to approximately 210 μC in case of one electron process (~420 μC for two electron process). For Pt surfaces, the surface area estimated from integrated polarization curves of underpotentially adsorbed hydrogen $H_{upd}$ and electrooxidized $CO_{ad}$ monolayer should be the same. However, in the case of bimetallic alloys with Pt-skin type of surfaces, adsorption of $H_{upd}$ can be greatly suppressed by altered electronic properties of Pt-skin surfaces, and therefore, the $H_{upd}$ surface coverage is much lower, while estimated surface area is underestimated and inaccurate. Contrary to that, CO adsorption is not affected because of the strong Pt—CO interaction, and the estimate based on integrated CO stripping curve provides more accurate values for surface area. As illustrated in FIGS. 8(a)-(b), the ECSA of annealed 3 ML of Pt over PtNi substrate was estimated from CO stripping and $H_{upd}$ polarization curves and obtained values are 0.18 and 0.12 cm², respectively. The substantially reduced ECSA (~33%) based on $H_{upd}$ versus $CO_{ad}$ is indicative of the formation of Pt-skin type of surface, which was not observed on unannealed thin film surfaces. Similar findings were also obtained for the acid treated/annealed PtNi/C catalyst, but not for the Pt/C and acid treated PtNi/C catalysts. This approach should be used not only to get accurate surface area, but also as a proof for the formation of Pt-skin type of surface over Pt-bimetallic system.

TABLE 1

|  | Pt/C | | acid treated PtNi/C | | acid treated/annealed PtNi/C | |
| --- | --- | --- | --- | --- | --- | --- |
|  | $H_{upd}$ | $CO_{ad}$ | $H_{upd}$ | $CO_{ad}$ | $H_{upd}$ | $CO_{ad}$ |
| C (μC) | 277 | 542 | 292 | 613 | 193 | 563 |
| ECSA (cm²) | 1.3 | 1.3 | 1.4 | 1.5 | 0.9 | 1.3 |

The ECSA estimated from integrated $H_{upd}$ charge was found to be substantially smaller than that obtained from electrochemical oxidation of adsorbed CO monolayer (FIGS. 8(a)-(b)), which was not observed on unannealed Pt-skeleton surfaces. Such a difference can only be interpreted by the altered electronic properties of Pt-skin surface that have affected the adsorption of hydrogenated species, but not Pt—$CO_{ad}$ interaction.

Simulations

Figure 13:
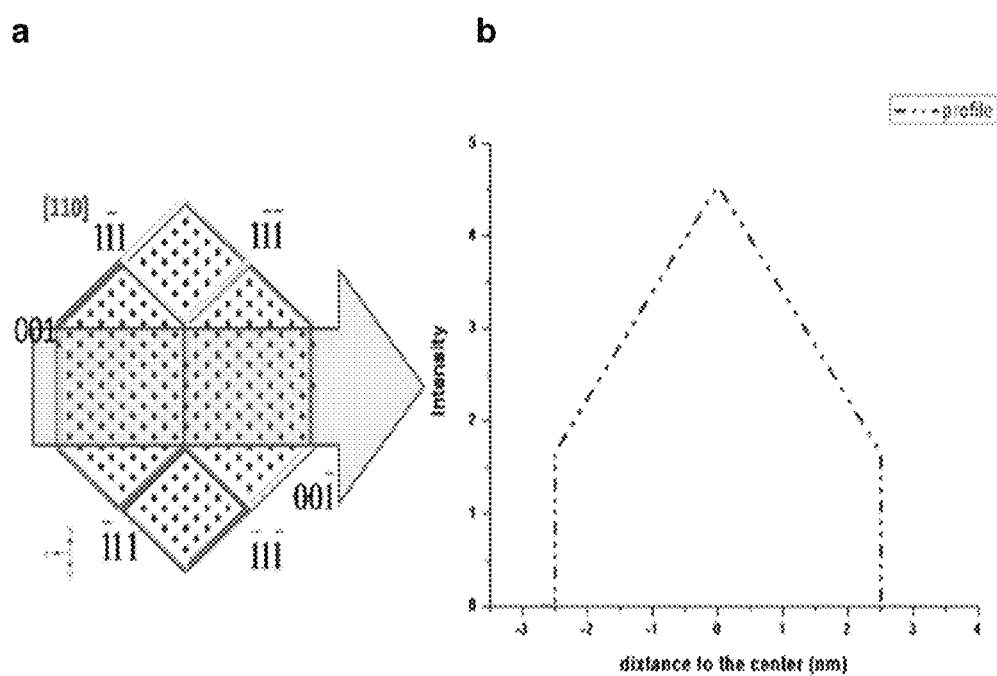
FIG. 13(a) is a schematic of a cubo-octahedral particle viewed along [110]
FIG. 13(b) is the ideal thickness profile along the arrow direction.

According to the geometry of the cubo-octahedron, the thickness profile along <001> direction while crossing the two edge-on (001) surfaces (shown as the shadowed arrow in FIG. 13(a)) should follow the equation:

$$y = \frac{D}{3} + \frac{\sqrt{3}}{3} \cdot D - \frac{2}{\sqrt{3}} \cdot |x|$$

where x≤D/2. The diameter of the particle D is defined as the interval between surface (001) and (001), y is the thickness, and x is the distance to the center along <001>. The line profiles calculated in this way does not count the contrast between Pt and Ni, and thus can be viewed as the intensity profiles for homogeneous alloy nanoparticles.

Both intensity and composition line profiles revealed a Pt-overlayer thickness of approximately 2 atomic layers in the acid treated/annealed PtNi/C catalyst particles (FIGS. 4(a)-(e)). This corresponds to a multilayered Pt-skin of approximately 0.5 nm thick. Considering an ideal model of the Pt/PtNi particle (e.g. 5 nm in diameter), it is also plausible to deduce through calculation that the central part (~4 nm in diameter) of the particle preserved approximately 50% of Ni after the treatments.

The amount of Ni in the particle can be written as $$N_{Ni} = N_{total} C_{Ni,overall}$$

where $N_{total}$ and $C_{Ni, overall}$ are the total number of atoms and overall ratio of Ni in the particle. EDX analysis, indicates that $C_{Ni, overall}$ is about 27%. Since the Pt-skin does not contribute any Ni, $N_{Ni}$ can also be expressed as $$N_{Ni}=N_{center}C_{Ni, center}.$$

The numbers of atoms ($N_{total}$ and $N_{center}$) are proportional to the volumes ($V_{total}$ and $V_{center}$), respectively. For fcc crystals each unit cell contains 4 atoms, represented by the following:

$$N_{center}=4V_{center}/\alpha_{PtNi}^3$$

$$N_{total}=4V_{skin}/\alpha_{Pt}^3+4V_{center}/\alpha_{PtNi}^3$$

where $\alpha_{Pt}$ and $\alpha_{PtNi}$ are the lattice parameter for the unit cells of Pt and PtNi, respectively. Due to the small difference between $\alpha_{Pt}$ and $\alpha_{PtNi}$, for simplicity, it is assumed that $\alpha_{Pt}=\alpha_{PtNi}=\alpha$, and write:

$$N_{center}=4V_{center}/\alpha^3$$

$$N_{total}=4V_{skin}/\alpha^3+4V_{center}/\alpha_i^3=4V_{total}/\alpha^3.$$

Combining the above equations provides the following:

$$4V_{total}/a^3 \cdot C_{Ni,overall} = 4V_{center}/a^3 \cdot C_{Ni,center}$$

and $$\begin{aligned}C_{Ni,center} &= V_{total}/V_{center} \cdot C_{Ni,overall}\\ &= (R/r)^3 \cdot C_{Ni,overall}\\ &= (2.5/2)^3 \cdot 27\%\\ &\approx 53\%.\end{aligned}$$

This result is also consistent with that obtained from atomistic simulation in the following.

In the simulation of particle structure, a perfect cubo-octahedral PtNi alloy nanoparticle (containing 4033 atoms) with a face-centered cubic (fcc) lattice and a diameter of 4.99 nm was constructed at first. In this $Pt_{50}Ni_{50}$ model particle, 2017 Pt atoms and 2016 Ni atoms were randomly distributed. Surface atoms in this cubo-octahedral nanoparticle refer to those atoms with coordination number less than or equal to 9. This definition was based on the fact that the atoms inside a cubo-octahedral particle of fcc phase have a coordination number of 12 while the atoms on the surface have coordination numbers of 9 on {111} facets, 8 on {100} facets, 7 at edges, and 6 at vertices.

To simulate the acid leaching process, all the Ni surface atoms were iteratively removed from the particle until the coordination number of all the remaining Ni atoms were larger than 9. With leaching out Ni surface atoms, the Pt surface atoms have lowering coordination numbers. The low-coordinated Pt atoms were relocated to the high-coordinated vacancies left by the removed Ni atoms for minimizing the total energy of the PtNi particle. In the resultant particle (FIGS. 4(a)-(e)), all the Ni atoms have coordination number larger than 9 and all the Pt atoms have coordination number larger than 6. Our simulation shows that the final particle had 2017 Pt atoms and 822 Ni atoms (namely, overall Pt concentration of ~71.0 at.%) and a size of about 4.76 nm (4.7% reduction in size compared with the initial particle). It is also found that the resulted particle core possesses a nearly unaltered composition of Pt/Ni≈1/1 and a Pt-overlayer of an average thickness of 2 atomic layers.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method of preparing a bimetallic alloy having enhanced electrocatalytic properties, comprising:
   synthesizing a PtNi nanoparticle;
   depleting a surface of the PtNi nanoparticle of nickel to create a platinum
   skeleton; and
   smoothing a surface of the platinum skeleton by annealing and creating the PtNi
   nanoparticle with multilayered platinum skin surfaces.

2. The method of claim 1, wherein the step of depleting a surface of the PtNi nanoparticle is achieved by exposing the PtNi nanoparticle to an acidic environment.

3. The method of claim 2, wherein the acidic environment comprises a pH of at least 1.0.

4. The method of claim 2, wherein the step of exposing the PtNi nanoparticle to the acidic environment is performed before the step of annealing the PtNi nanoparticle.

5. The method of claim 2, further comprising the step of incorporating the PtNi nanoparticle on high surface area carbon by colloidal deposition, forming an electrocatalyst.

6. The method of claim 1, wherein the platinum skin comprises three or less atomic layers of platinum.

7. The method of claim 1, wherein the step of annealing is conducted at approximately 400 degrees Celsius.

8. The method of claim 7, wherein the step of annealing is conducted for at least thirty minutes.

9. A method of preparing a platinum-nickel electrocatalyst, comprising:
   synthesizing a PtNi nanoparticle;
   depleting a surface of the PtNi nanoparticle of nickel by exposing the PtNi nanoparticle to an acidic environment to create a platinum skeleton surface;
   smoothing a surface of the platinum skeleton by annealing to create the PtNi nanoparticle with a multilayered platinum skin; and
   incorporating the PtNi nanoparticle on high surface area carbon by colloidal deposition.

10. The method of claim 9, wherein the synthesizing step further comprises heating the PtNi nanoparticle to remove organic surfactants.

11. The method of claim 9, wherein the platinum skin comprises 3 or less atomic layers of platinum.

* * * * *